Patented Mar. 14, 1939

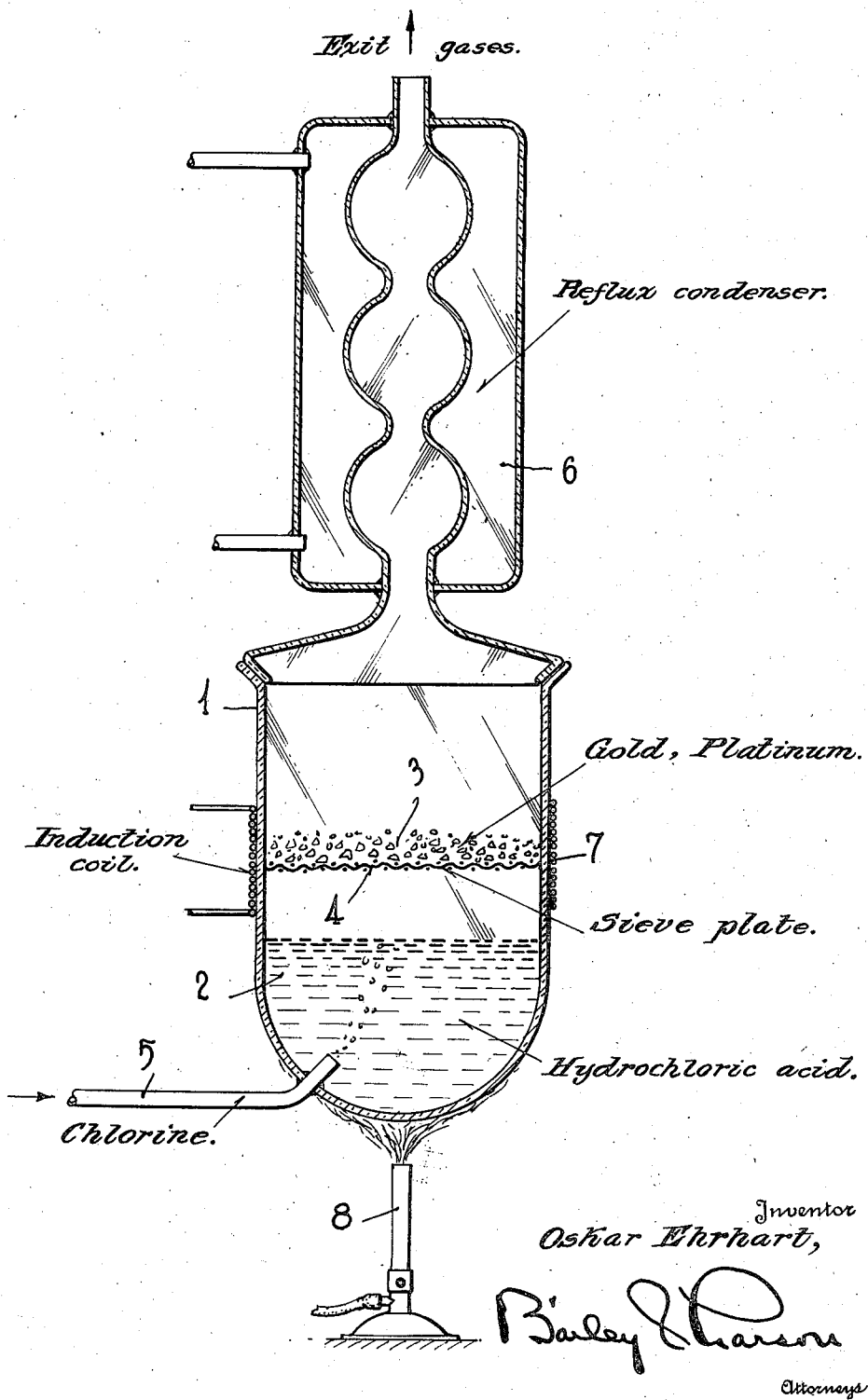

2,150,366

UNITED STATES PATENT OFFICE 2,150,366

PROCESS FOR CONVERTING GOLD, PLATINUM, AND OTHER METALS OF THE PLATINUM GROUP INTO A DISSOLVED FORM

Oskar Ehrhart, Frankfort-on-the-Main, Germany, assignor to Deutsche Gold und Silber Scheideanstalt vormals Roessler, Frankfort-on-the-Main, Germany, a corporation of Germany Application January 17, 1938, Serial No. 185,279½
In Germany January 20, 1937

11 Claims. (Cl. 75—112)

My invention relates to a process for converting gold, platinum and other metals of the platinum group into a dissolved form. The process is distinguished by its simplicity and economy.

A procedure hitherto followed for converting metallic platinum and also gold into a soluble form has for example been to treat the metal with aqua regia. A considerable quantity of liquid however results therefrom, the removal of which entails a considerable expenditure of fuel and time. Moreover, in order to effect complete removal of the nitric acid, repeated heating and evaporating down with concentrated hydrochloric acid are necessary.

It has already been proposed to convert platinum into the soluble anhydrous chloride by heating platinum wire in a current of chlorine. A further and better proposal has been to produce the soluble anhydrous chloride from chloroplatinic acid by heating the same, preferably in a current of chlorine, at 275 to 360° C. The latter method employing chloroplatinic acid is very troublesome both as such and also in view of the high temperatures which have to be employed.

It is also known that gold can be converted into $AuHCl_4$ or $AuCl_3$ by the action of gaseous chlorine at elevated temperature. Even when the gold is present in finely divided form, however, this conversion takes a very long time, when using quantities such as are usually used in actual practice the time taken may even amount to several days. In addition thereto the $AuHCl_4$ on treatment with water or hydrochloric acid always leaves behind an insoluble residue of $AuCl$. The latter on further treatment with hot water in part decomposes into finely divided metallic gold, which must be again treated with chlorine in order to be converted into soluble form.

Moreover the necessity of employing the gold in a form having a large surface area particularly easily capable of being acted on by chlorine, for example in the form of gold leaf, renders the process extremely uneconomical, since the conversion of the gold into a form as aforesaid, for example leaf form, is attended with considerable expense.

In addition to bringing gold into solution by treatment with aqua regia and other liquids evolving nascent chlorine it is also known to bring gold into solution, although more slowly, by treatment with chlorine water.

It has also been proposed in order to produce platinum in a soluble form to start from platinum sponge and to treat this in fuming hydrochloric acid with pure chlorine. In this case care must be taken to ensure that the introduction of chlorine is effected at relatively long intervals of time and that after each introduction of chlorine the platinum sponge immersed in the fuming hydrochloric acid is left at rest for a relatively long time with efficient exclusion of air. An essential feature of this process is that the platinum should be present in a particularly finely divided spongy form. In practical operation however the platinum and other metals of the platinum group as well as gold are in general exclusively present in a compact form, for example in the form of sheets, strips, gauze, etc. According to the aforesaid known process these compact forms of platinum must first be converted into platinum sponge.

According to my invention it has been unexpectedly found that, even in their compact form, platinum, as well as the other metals of the platinum group, such as palladium, osmium, rhodium and ruthenium, and also gold may be converted into a soluble form or brought into solution with great rapidity without it being necessary previously to convert the metal into a form having a particularly large surface area, by subjecting the metal, preferably at elevated temperature, to the simultaneous action of gaseous chlorine and hydrochloric acid vapours.

I have found that in this manner platinum can be brought considerably more rapidly into solution than by subjecting it as hereinbefore described in the form of sponge to the action of chlorine in liquid hydrochloric acid and also that for the conversion of gold into soluble form the present process requires only a fraction of the time necessary for effecting solution in chlorine water. In view of the high value of the material to be treated the acceleration of the process of solution achieved by my invention is however of great importance, since considerable economies may be effected in the interest on the capital invested in the valuable metals.

In place of the pure metals as such, their alloys with one another and with other metals may also be treated in the manner indicated.

A preferred method of carrying the process of this invention into effect is to introduce the precious metal to be brought into solution, for example platinum or gold, in granule or sheet form, into a vessel containing hydrochloric acid and provided with a reflux condenser in such a way that the metal is disposed in the space above the surface of the liquid, to heat the hydrochloric acid and simultaneously to introduce chlorine into the aforesaid space, for example by passing the chlorine through the liquid hydrochloric acid. The chlorine combines practically completely with the metal and the ascending water vapour dissolves the soluble salt formed.

In this method 1.735 kgms. of 38% hydrochloric acid and 1.900 kgms. of chlorine are required to dissolve 3.5 kgms. of gold. Approximately 5 hours are required to dissolve the gold, whereas the same quantity of gold, when using chlorine alone, can only be brought into solution after several days.

For dissolving 100 gms. of platinum in the form of sheets 0.1 mms. in thickness 80 gms. of chlorine and 200 gms. of 20% hydrochloric acid are required. At boiling temperature solution takes place in 5 hours.

For dissolving 100 gms. of palladium in the form of sheets 0.1 mms. in thickness 75 gms. of chlorine are required. In the presence of 200 gms. of 10% hydrochloric acid at boiling temperature solution takes place in 2½ hours.

10 gms. of osmium in powder form in the presence of 30% hydrochloric acid at boiling temperature were dissolved in 8 hours.

The possibility according to this invention of bringing even metals of the platinum group, such as osmium, rhodium and ruthenium, relatively rapidly into solution must be regarded as being entirely unexpected in view of the known extraordinary resistance of these metals to attack by liquid acids.

According to the process of this invention the chlorine and hydrochloric acid vapours are advantageously caused to react at elevated temperatures, for example at temperatures over 80° C., for example at from 125 to 200° C. or at the boiling temperature of the hydrochloric acid. The use of pressure has also proved to be advantageous.

In certain cases the metal to be dissolved is with advantage independently heated, for example by means of high frequency induction.

The accompanying drawing diagrammatically shows by way of example an arrangement of apparatus for carrying out the present invention.

In the drawing 1 designates a vessel which contains hydrochloric acid 2. The metal 3 to be dissolved is disposed above the surface of the hydrochloric acid by the sieve plate 4. Chlorine is introduced into the vessel 1 through conduit 5. The vessel 1 is also provided with a reflux condenser 6. 7 represents an induction coil which may be employed to heat the metal 3 to be dissolved independently. The Bunsen burner 8 furnishes the heat for heating the hydrochloric acid.

What I claim is:

1. A process for the treatment of gold and the platinum metals in the elemental state yielding soluble chlorides which consists in subjecting said metals to the simultaneous action of hydrochloric acid vapors and chlorine gas.

2. A process for the treatment of gold and the platinum metals in the elemental state yielding soluble chlorides which consists in subjecting said metals to the simultaneous action of hydrochloric acid vapors and chlorine gas at elevated temperatures.

3. A process for the treatment of gold and the platinum metals in the elemental state yielding soluble chlorides which consists in subjecting said metals to the simultaneous action of hydrochloric acid vapors and chlorine gas at temperatures exceeding 80° C.

4. A process for the treatment of gold and the platinum metals in the elemental state yielding soluble chlorides which consists in subjecting said metals in a compact form to the simultaneous action of hydrochloric acid vapors and chlorine gas.

5. A process for the treatment of gold in the elemental state yielding soluble chlorides which consists in subjecting said gold to the simultaneous action of hydrochloric acid vapors and chlorine gas at elevated temperatures.

6. A process for the treatment of platinum in the elemental state yielding soluble chlorides which consists in subjecting said platinum to the simultaneous action of hydrochloric acid vapors and chlorine gas at elevated temperatures.

7. A process for the treatment of palladium in the elemental state yielding soluble chlorides which consists in subjecting said palladium to the simultaneous action of hydrochloric acid vapors and chlorine gas at elevated temperatures.

8. A process for the treatment of gold and the platinum metals in the elemental state yielding soluble chlorides which consists in disposing said metals in a vessel above the surface of aqueous hydrochloric acid, heating the hydrochloric acid and passing chlorine gas through the vessel.

9. A process for the treatment of gold and the platinum metals in the elemental state yielding soluble chlorides which consists in disposing said metals in a vessel above the surface of aqueous hydrochloric acid, heating the hydrochloric acid to boiling, passing chlorine gas into the space above the acid and condensing the vapors.

10. A process for the treatment of gold and the platinum metals in the elemental state yielding soluble chlorides which consists in disposing said metals in a vessel above the surface of aqueous hydrochloric acid, passing chlorine gas into the space above the acid while heating the precious metal independently.

11. A process for the treatment of gold and the platinum metals in the elemental state yielding soluble chlorides which consists in disposing said metals in a vessel above the surface of aqueous hydrochloric acid, passing chlorine gas into the space above the acid while heating the precious metal independently by high frequency induction.

OSKAR EHRHART.